2,872,471

PREPARATION OF ALKYL SILANES BY THE GRIGNARD REACTION EMPLOYING CYCLIC ETHERS

Hugh E. Ramsden, Metuchen, and Sanders D. Rosenberg, Plainfield, N. J., assignors to Metal & Thermit Corporation, New York, N. Y., a corporation of New Jersey No Drawing. Application November 28, 1955
Serial No. 549,516

9 Claims. (Cl. 260—448.2)

This invention relates to a process for producing alkyl silanes and more particularly to a process for producing alkylsilanes, alkylhalosilanes, alkylalkoxysilanes, and alkylaryloxysilanes.

Akylsilanes have been prepared by three conventional syntheses, each of which has specified disadvantages. The simplest synthesis is the "direct method" in which alkyl chloride is caused to react with silicon (or silicon metal alloy). Alkylsilanes having short carbon chains are reported to have been obtained in good yields by this process. Alkylsilanes having longer carbon chains may also be prepared by this process, but the yields drop off sharply. The classic Grignard synthesis (carried out in ethyl ether) has also been attempted, but the yields drop off with the longer chain alkyls. In addition, this method involves using ethyl ether which is an inherently dangerous and expensive operation. Alkylsilanes have also been prepared utilizing a lithium synthesis. This method is extremely costly. No method has been known for preparing long-chain alkyl silanes efficiently and economically, when carried into practice on an industrial scale.

It has now been discovered that alkylsilanes, alkylhalosilanes, alkylalkoxysilanes, and alkylaryloxysilanes can be prepared by the utilization of an efficient and economical chemical reaction process.

It is an object of this invention to provide an efficient process for the production of alkylsilanes.

It is another object of this invention to provide a process for the production of alkylsilanes containing at least two different alkyl radicals.

It is still another object of this invention to provide a process for producing alkylsilanes containing at least one long chain alkyl group bonded to the silicon atom.

The invention also contemplates a process for producing alkylhalosilanes, alkylalkoxysilanes, and alkylaryloxysilanes.

Still another object of the invention is to provide an efficient process for producing long chain tetraalkylsilanes.

The present invention contemplates a process comprising reacting an alkyl halide with magnesium in a compound Q, to form an alkylmagnesium halide which is then caused to react with a silicon reactant in a relatively high boiling hydrocarbon solvent medium to form alkylsilanes, alkylhalosilanes, alkylalkoxysilanes, or alkylaryloxysilanes.

Compound Q is a substituted or unsubstituted heterocyclic compound (having 5 or 6 atoms in the ring) containing one oxygen atom in the ring structure; the other ring atoms being carbon with the exception that one nitrogen atom may be substituted for any carbon atom other than those carbon atoms adjacent to the oxygen. The heterocyclic compounds may contain a single unsaturated bond, as in dihydropyran. Compounds within this definition include tetrahydrofuran, tetrahydropyran, 2-methyltetrahydrofuran, 2-ethoxytetrahydropyran, tetrahydrofurfuryl ethyl ether, dihydropyran, and N-methylmorpholine. Permissible substitutions are groups which are not reactive with organomagnesium chlorides, or with any of the other components and products of the reaction mixtures of the present process, and includes substituted and unsubstituted alkyl, aryl, alkoxy and aryloxy groups (all allowable substitutes being those unreactive to other components of the reaction mixture as specified hereinbefore). Where nitrogen replaces a carbon atom, hydrogen on the nitrogen atom must be substituted with a group unreactive to the reactants or reaction products. A further requirement for Q is that the oxygen must be available for electron donation, i. e., the free p-electrons present on the oxygen should be available for coordination with the organomagnesium chloride. Any large blocking groups in the 2 and 5 (6) position may restrict the availability of these electrons. Another way these electrons may be restricted in their availability is by p-pi resonance, as for example in furan, which is not operative. One double bond giving p-pi resonance, as in dihydropyran (which is operative) allows reactivity since the oxygen still has free p-electrons. Expressed in another fashion, the oxygen of the heterocyclic ring structure must be such that electrons of the oxygen atom are available for coordination and complex formation with magnesium. Since Q also apparently functions as a solvent, a Q which has a high melting point may still function in this invention, but if it is used as solvent, obviously the high melting point (e. g., above 90° C.) causes great difficulty in carrying out the reaction. Any liquid Q of any structure whatsoever (with the limitations specified hereinbefore) will work.

More particularly, the invention comprises reacting an alkyl chloride with magnesium in a compound Q solvent to form an alkyl magnesium halide. The reaction sometimes requires initiation, e. g., the addition of a small amount of ethyl bromide, the addition of a small amount of ethyl bromide and an iodine crystal, the addition of a mixture of a small amount of ethyl bromide and ethyl ether, or any combination of the above, etc. Once the reaction has been started by the addition of a small amount of a mixture of the alkyl chloride and the solvent to magnesium turnings, with initiation if necessary, it is continued by the addition (a gradual addition is preferred) of the remainder of the alkyl-chloride-solvent mixture. The reaction is usually exothermic and it usually maintains itself under reflux conditions without the application of external heat. After the addition is completed, the entire reaction mixture is maintained at reflux, with the application of external heat, if necessary. Agitation of the reaction mixture is maintained during the entire course of the process. An inert atmosphere is preferred during the entire course of the reaction. When the reaction has proceeded to the point where substantially all of the alkyl chloride has been converted to the alkyl magnesium chloride; a solution, or physical mixture, of a silicon reactant in a high boiling hydrocarbon solvent is added to the mixture in the reactor, or the alkyl magnesium chloride may be added to the silicon reactant-solvent mix. The initial solvent, the compound Q, is usually removed from the mixture (in part to substantially all) preferably by a relatively low temperature distillation, when preparing the tetraalkyl silanes. It would usually not be removed when preparing an alkylhalosilane. The reaction mixture is then heated to reflux and maintained under reflux conditions until the formation of the product has proceeded to the desired degree of completion. The various reactants are then separated.

In the preparation of alkylsilanes, separation is usually effected by hydrolyzing the reaction mixture to obtain the water soluble products, such as the magnesium halide, in the aqueous phase, and the alkylsilanes in the hydrocarbon phase. If the product being prepared is an alkylhalosilane, alkylalkoxysilane or alkylaryloxysilane, the hydrocarbon phase is filtered from the magnesium halide. The hydrocarbon phase is then separated, dried, and the various components, i. e., the solvent and the one or more organosilanes, are separated by distillation.

The product(s) of the present process are described by the formula:

$$RR'_bR''_cR'''_dSiX_{3-(b+c+d)}$$

wherein $b$, $c$ and $d$ equal 0 or 1; $b+c+d$ may not be greater than 3; R, R', R'' and R''' may be the same or different and are selected from the group consisting of hydrogen, alkyl, cycloalkyl, alkandiyl, e. g.,

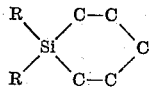

alkenyl, cycloalkenyl, alkadienyl, cycloalkadienyl, alkenediyl, alkynyl, alkadiynyl, alkyndiyl, and aralkyl radicals, with the exception that the silicon atom may not be bonded to an unsaturated carbon atom, said radical may be substituted by other elements, groups or radicals which are not reactive with other constituents of the organosilane; and X is halogen, alkoxy or aryloxy. Halogen includes iodine, bromine, chlorine and fluorine. The following type compounds are the products included within the general formula above, RR'R''R'''Si, RR'R''SiX, RR'SiX$_2$ and RSiX$_3$. The above compounds, include, but are not limited to dibutyldioctylsilane, dibutyldidodecylsilane, diisoamyldioctylsilane, methyltrioctylsilane, isoamyltridecylsilane, ditetradecyldibutoxysilane, dioctyldi-2,4-xyloxysilane, didodecyldi-p-tolyloxysilane, dodecyltriethoxysilane, isoamyldodecyldichlorosilane, octadecyldichlorosilane, tetraoctadecylsilane, etc.

The present process is applicable to preparing silanes having up to thirty carbons in the alkyl chain, and particularly advantageous in the production of silanes having long alkyl chains, i. e., chains having eight or more carbon atoms. No reason is seen why the process should not be operative with silanes containing even more than 30 carbon atoms in the alkyl chain, with the availability of such alkyl radical-containing hydrocarbons.

By the practice of the present invention, it is possible to obtain the alkylsilanes, alkylhalosilanes, alkylalkoxysilanes, and alkylaryloxysilanes as a single reaction product or a mixture of reaction products, depending upon the reactants used, the relative proportions of the reactants used and on the process conditions. The reaction product will usually be a mixture of two or three of the aforementioned products. By control of the variables, it is possible to produce a product containing a preponderance of a desired reaction product. A single reaction product may be obtained in a number of ways. Reacting RMgX with R$_3$SiX will yield tetraalkyl silanes. A sufficient excess of RMgX with SiX$_4$, e. g., about 4 to 1, will give a high yield of R$_4$Si. Similarly, a sufficient excess of RMgX with R'SiX$_3$ or R'R''SiX$_2$ will give a high yield of R$_3$R'Si, and R$_2$R'R''Si respectively. A ratio of RMgX to SiX$_4$ of approximately 2 to 1 will yield a preponderance of R$_2$SiX$_2$.

It is possible to produce the di- or more highly alkylated silanes by a multiple use of this process. An organomagnesium chloride is reacted with a silicon reactant to produce a final product that is a mono-, di- or tri-alkylated silane. This product is then utilized as the silicon reactant, which is in turn reacted with an organomagnesium halide to prepare a more highly alkylated product. This multiple process is used when the desired alkyl silane contains at least two different alkyl groups bonded to the silicon atom. The multiple process is similarly applicable to the production of the more highly substituted alkylhalosilanes, alkylalkoxysilanes, and alkylaryloxysilanes. The silicon compounds referred to herein as a reactant in the process are described by the following formula:

$$R'_bR''_cR'''_dSiX_{4-(b+c+d)}$$

wherein $b$, $c$, $d$, R', R'', R''' and X are the same as defined above and $b+c+d$ may not be greater than 3. Some examples of the silicon compounds are: silicon tetrahalides, silicohaloforms, organic orthosilicates, organohalosilanes, organoalkoxysilanes, and organoaryloxysilanes. Suitable organohalosilanes are alkylhalosilanes, and aralkylhalosilanes. The silicon reactant may be more specifically exemplified by alkyltrichlorosilane (RSiCl$_3$), alkyldichlorosilane (RHSiCl$_2$), dialkyldichlorosilane (R$_2$SiCl$_2$), trialkylmonochlorosilane, etc. These silicon compounds, with the exception of the SiX$_4$ type compounds, the silicon orthoesters and the silicon haloform type compounds, are among the compounds that, in the first instance, may be produced by the process of the present invention. The product of one run of the process may be utilized as the silicon compound reactant in a second run to utilize the process to prepare a more highly substituted product.

The compound Q, employed to promote reaction and to form a complex with the alkyl magnesium chloride may be a simple 5 or 6 member heterocyclic compound containing one oxygen in the ring and having the requisite characteristics set forth above, e. g., tetrahydrofuran, tetrahydropyran, dihydropyran, etc. It may also be a 5 or 6 member heterocyclic compound containing one oxygen in the ring and further substituted by monovalent groups and having said characteristics, e. g., 2-methyltetrahydrofuran, 2-ethoxytetrahydrofuran, tetrahydrofurfuryl ethyl ether, N-methyl morpholine, etc. It is desirable to utilize about 3 mole equivalents of the above defined compound Q for each mole equivalent of the alkyl chloride in preparing the alkyl magnesium halide. It is believed that the alkyl magnesium halide initially formed in the solvent actually is a complex of the type RMgX·$n$Q; $n$ is equal to a small number. When the type compound, RMgX, is herein referred to, it is contemplated that it may also refer to the complex. The preparation of alkyl magnesium halides is further described in patent application Serial No. 549,541, filed on the same date as this application.

The alkyl silanes, as defined herein, are prepared by the process described and claimed in this application. The process conditions are varied somewhat, dependent upon the particular alkyl silane being prepared. The alkyl silanes containing four long-chain alkyl groups attached to the silicon atom are the most difficult to prepare and require the use of a high boiling hydrocarbon solvent. The shorter chain alkyl silanes (containing alkyl chains having less than eight carbon atoms in the chain) and the RSiX$_3$, RR'SiX$_2$ and RR'R''SiX type compounds may be prepared in lower boiling solvents (the boiling point of the solvent system may be as low as 36° C.). The hydrocarbon solvent utilized should be inert to the reactants and the reaction products. The high boiling solvent should preferably boil above about 125° C. These high boiling solvents include such hydrocarbons as xylene, cumene, and high boiling petroleum fractions as kerosene.

Generally speaking, the chemical reactions that take place during this process are illustrated in Equation 1. Equation 2 illustrates the preparation of the alkyl magnesium chloride; Y being the symbol used for chlorine, (1) $RMgY + R'_bR''_cR'''_dSiX_{4-(b+c+d)} \rightarrow$
$$RR'_bR''_cR'''_dSiX_{3-(b+c+d)}$$

(2) $RY + Mg + n \cdot Q \rightarrow RMgY \cdot nQ$

In these equations R, R', R'', R''', X, $b$, $c$, $d$, $n$ and Q are the same as defined.

The multiple use of the process to produce alkyl silanes having different alkyl groups attached to the silicon atom is illustrated in Equations 3 through 6, which show the chemical reactions involved in the preparation of didecyldidodecylsilane.

(3) $C_{10}H_{21}Cl + Mg \xrightarrow{nQ} C_{10}H_{21}MgCl$ (4) $C_{12}H_{25}Cl + Mg \xrightarrow{nQ} C_{12}H_{25}MgCl$ (5) $2C_{10}H_{21}MgCl + SiCl_4 \rightarrow (C_{10}H_{21})_2SiCl_2$ (6) $2C_{12}H_{25}MgCl + (C_{10}H_{21})_2SiCl_2 \rightarrow$
$(C_{10}H_{21})_2(C_{12}H_{25})_2Si$ For the purposes of giving those skilled in the art a better understanding of the invention, the following illustrative examples are given. It is to be understood, however, that the present invention is not restricted thereto.

Example I 1.0 liter of a solution of 6,250 grams (30.5 moles) of dodecyl chloride in 6,480 grams (90 moles) of tetrahydrofuran solvent was added to a 30 gallon reactor containing 754 grams (31 gram atoms) of magnesium turnings. The reaction was initiated by the addition of 10 grams of ethyl bromide and heat. The initiation was prompt and vigorous. The remainder of the halide mix was then added at a rate to maintain reflux without the application of external heat. On completion of this addition, the reaction mixture was refluxed for 6 hours with the application of external heat.

1,005 grams (6.2 moles) of silicon tetrachloride dissolved in 2 gallons of xylene was added to the reactor contents. When this addition was complete, an additional 8 gallons of xylene was added and the reactor contents were distilled at 100–135° C. to remove all the tetrahydrofuran as distillate. The reaction mix was then maintained at reflux for 7 days. A Gilman and Schulze Color Test I was negative, indicating all the dodecylmagnesium chloride had reacted.

The mixture was hydrolized by the addition of 10 gallons of an iced-5% HCl solution, while cooling the reactor. Two clear layers resulted, an aqueous layer which was discarded and the xylene layer which was dried on sodium sulfate and filtered. The solvents were removed by distillation at 135–165° C. and the residue vacuum distilled. The results of the distillation were as follows:

Cut 1—25–180°/1.0 mm., xylene, dodecane and dodecyl chloride.
Cut 2—180–220°/1.0 mm., didodecane.
Cut 3—220–275°/0.5 mm., didodecane, tridodecylsilanol, tetradodecylsilane; 808 g.
Cut 4—275–320°/0.5 mm., tridodecylsilanol, tetradodecylsilane; 2904 g.
Cut 5—pot bottoms, hexadodecyldisiloxane and other siloxanes; 844 g.
Cut 4—275–320°/0.5 mm., 2904 g. was carefully redistilled twice to yield 2080 g. (47.6%) of tetradodecylsilane distilling at 302–308°/0.5 mm.

The tetradodecylsilane was prepared in a yield of 47.6%, and had the following physical properties:

$n_D^{25}$ 1.4628, $d_4^{25}$ 0.8310, percent Si 4.10, percent Cl 0.00

Example II.—Dodecyl trichlorosilane and bis-dodecyldichlorosilane 510 grams (2.49 moles) of lauryl chloride were dissolved in 540 grams (7.5 moles) of tetrahydrofuran. 25 ml. of this mixture were added to a two liter flask containing 60.8 grams (2.5 gram-atoms) of magnesium turnings. The reaction was initiated by the addition of 0.5 ml. of ethyl bromide. After initiation, the mixture was added at a rate to maintain reflux. On completion of the addition, the solution was refluxed for 3 hours.

1000 grams (5.89 moles) of silicon tetrachloride were dissolved in 2 liters of commercial n-heptane (B. P. 210° F.) solvent in a 5 liter flask. The reaction products from the 2 liter flask were added over a 2½ hour period with constant stirring. The mix was then refluxed for 1 hour and allowed to stand overnight.

The magnesium chloride salt was separated from the reaction products via a filter stick and washed with 200 to 250 ml. portions of the heptane solvent which were then combined with a main solution. The solvents were removed from the mixture of reaction products by distillation at 1 atmosphere.

The pot residue was fractionally distilled resulting in a total isolable yield of dodecyl trichlorosilane for a percentage yield of 64.5%. Of this amount 449.3 grams of high purity dodecyl trichlorosilane was recovered for a percentage yield of 59.5%. In addition it appears that 63.1 gram (11.6%) of bis-dodecyl-dichlorosilane was prepared.

Example III

Following the procedure as set forth in Example II, octadecyl magnesium chloride is prepared in tetrahydropyran and reacted with silicon tetrachloride to form octadecyl trichlorosilane.

Example IV

Following the procedure as set forth in Example I, dodecyl magnesium chloride is prepared in methyltetrahydrofuran and reacted with silicon tetrafluoride/cumene solution to yield tetradodecylsilane.

Example V

Following the procedure as set forth in Examples I and II, octadecyl magnesium chloride is prepared and 2 moles are reacted with one mole of dimethyl dichlorosilane to produce dimethyldioctadecylsilane.

Example VI

Following the procedure as set forth in Examples I and II, dodecyl magnesium bromide is prepared and 2 moles are reacted with one mole of dimethyl dichlorosilane to yield dimethyldidodecylsilane.

Example VII

Following the procedure as set forth in Examples I and II, octadecyl magnesium chloride is prepared and 2 moles are reacted with one mole of diethyldichlorosilane to yield dioctadecyldiethylsilane.

Example VIII

Following the procedure as set forth in Examples I and II, dodecyl magnesium iodide is prepared and 2 moles are reacted with one mole of diethyldichlorosilane to yield didodecyldiethylsilane.

Example IX

Following the procedure as set forth in Example II, ethyl magnesium chloride is prepared and reacted with silicon tetrachloride to yield diethyldichlorosilane.

Example X

Following the procedure as set forth in Example II, decyl magnesium chloride is prepared and one mole is reacted with 1 mole of ethyl triethoxysilane to yield decylethyldiethoxysilane.

Example XI

Following the procedure as set forth in Example II, octadecyl magnesium chloride is prepared and one mole is reacted with one mole of diethyl diphenoxysilane to yield octadecyldiethylphenoxysilane.

Example XII

Following the procedure as set forth in Example II, dodecyl magnesium chloride is prepared and one mole reacted with one mole of tetraethyl orthosilicate to yield dodecyltriethoxysilane.

Example XIII

Following the procedure as set forth in Example II, butyl magnesium bromide is prepared and 3 moles are reacted with one mole of silicon chloroform to yield tributylsilane.

Example XIV

Following the procedure as set forth in Example I, butyl magnesium chloride is prepared and 2 moles are reacted with one mole of silicon chloroform to yield dibutylchlorosilane.

The present invention provides an efficient and flexible process for preparing a wide variety of silicon compounds. The alkyl silanes are characterized by extreme resistance, inertness and stability over a wide temperature range. Thus, these materials make excellent lubricants and hydraulic fluids, e. g., didecyldidodecyl silane is an excellent hydraulic fluid for uses involving wide variations in temperature.

While the invention has been described with particular reference to specific embodiments, it is to be understood that it is not limited thereto but is to be construed broadly and restricted solely by the scope of the appended claims.

We claim:

1. A process for producing organosilanes comprising reacting an alkylmagnesium chloride with a silicon reactant selected from the group consisting of silicon tetrahalides, silicon haloforms, organic orthosilicates, organohalosilanes, organoalkoxysilanes and organoaryloxysilanes to produce at least one organosilane selected from the group consisting of alkylsilanes, alkylhalosilanes, alkylalkoxysilanes and alkylaryloxysilanes, wherein the silicon atom in said silanes may not be bonded to an unsaturated carbon atom, and recovering said organosilane, said reactions, at least in part, being carried out in the presence of a compound Q as a reaction medium, said compound Q being an ether containing from 5 to 6 atoms in the ring and wherein (a) there is only one oxygen atom in the ring, (a) the other ring atoms are carbon, (c) one ring carbon separated from the oxygen atom in the ring by two carbon atoms may be replaced by an alkyl substituted nitrogen atom, (d) the ring contains not more than one double bond, (e) at least one carbon atom adjacent the oxygen atom in said ring being free of any substituents other than hydrogen, (f) said ether contains no substituent which reacts with organomagnesium chlorides or with other components or products of the reaction mixture.

2. The process described in claim 1, wherein Q is the only solvent.

3. A process for preparing organosilanes comprising reacting an alkylmagnesium chloride complex of a compound Q, with a compound having the formula

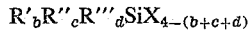

in an inert hydrocarbon solvent utilized as the reaction medium, to produce an organosilane having the formula

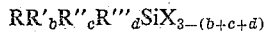

wherein $b$, $c$ and $d$ have a value of from 0 to 1, $b+c+d$ may not be greater than 3, R', R", and R''' are selected from the group consisting of hydrogen, alkyl, cycloalkyl, alkandiyl, alkenyl, cycloalkenyl, alkadienyl, cycloalkadienyl, alkenediyl, alkynyl, alkadiynyl, alkyndiyl and aralkyl radicals, with the silicon atom bonded only to saturated carbon atoms, and X is selected from the group consisting of halogen, alkoxy and aryloxy radicals, and separating said compounds from the reaction products, said compound Q being an ether containing from 5 to 6 atoms in the ring and wherein (a) there is only one oxygen atom in the ring, (b) the other ring atoms are carbon, (c) one ring carbon separated from the oxygen atom in the ring by two carbon atoms may be replaced by an alkyl substituted nitrogen atom, (d) the ring contains not more than one double bond, (e) at least one carbon atom adjacent the oxygen atom in said ring being free of any substituents other than hydrogen, (f) said ether contains no substituent which reacts with organomagnesium chlorides or with other components or products of the reaction mixture.

4. A process for preparing long-chain organosilanes comprising reacting with agitation a long-chain alkylmagnesium chloride complex with Q with a silicon reactant selected from the group consisting of silicon tetrahalides, silicon haloforms, organic orthosilicates, organohalosilanes, organoalkoxysilanes, and organoaryloxysilanes in an inert hydrocarbon solvent having a boiling point in excess of 125° C., at a temperature between room temperature and the reflux temperature of the reaction mixture, to produce at least one long-chain organosilane selected from the group consisting of alkylsilanes, alkylhalosilanes, alkylalkoxysilanes and alkylaryloxysilanes, and separating said organosilanes, in which the silicon atom is bonded only to saturated carbon atoms, said compound Q being an ether containing from 5 to 6 atoms in the ring and wherein (a) there is only one oxygen atom in the ring, (b) the other ring atoms are carbon, (c) one ring carbon separated from the oxygen atom in the ring by two carbon atoms may be replaced by an alkyl substituted nitrogen atom, (d) the ring contains not more than one double bond, (e) at least one carbon atom adjacent the oxygen atom in said ring being free of any substituents other than hydrogen, (f) said ether contains no substituent which reacts with organomagnesium chlorides or with other components or products of the reaction mixture.

5. The process of claim 1 wherein the alkylmagnesium chloride has the formula $RCH_2MgCl$ and the silicon reactant is an organosilane of the formula $(R'CH_2)_2SiCl_2$ wherein R and R' are alkyl groups of from 8 to 18 carbon atoms.

6. The process of claim 1 wherein the alkylmagnesium chloride has the formula $RCH_2MgCl$ and the silicon reactant has the formula $(R'CH_2)_3SiCl$, and wherein R and R' are alkyl groups of from 8 to 18 carbon atoms.

7. The process of claim 5 in which compound Q is selected from the class consisting of tetrahydrofuran, tetrahydropyran, 2-ethoxytetrahydropyran, dihydropyran, tetrahydrofurfuryl ethyl ether, 2-methyltetrahydrofuran, and N-methylmorpholine.

8. The process of claim 1 wherein the alkylmagnesium chloride has the formula $RCH_2MgCl$ in which R is an alkyl group of from 8 to 18 carbon atoms, and wherein the silicon reactant is silicon tetrachloride.

9. The process of claim 1 wherein the alkylmagnesium chloride has the formula $RCH_2MgCl$ in which R is an alkyl group of from 8 to 18 carbon atoms, and wherein the silicon reactant is tetraethyl orthosilicate.

References Cited in the file of this patent

UNITED STATES PATENTS

| | | |
|---|---|---|
| 2,413,050 | Hyde | Dec. 24, 1946 |
| 2,414,505 | Arntzen | Jan. 21, 1947 |
| 2,476,529 | Barry | July 19, 1949 |
| 2,552,676 | Hill | May 15, 1951 |
| 2,698,334 | Rust et al. | Dec. 28, 1954 |

OTHER REFERENCES

Hepworth: "Jour. Chemical Society" (London), vol. 119, part 2 (1921), pp. 1249–1256.

Kharasch et al.: "Grignard Reactions of Nonmetallic Substances," Prentice-Hall, Inc., New York (October 1954), pp. 24, 49–50, 1306–1309.

UNITED STATES PATENT OFFICE
Certificate of Correction

Patent No. 2,872,471 February 3, 1959

Hugh E. Ramsden et al.

It is hereby certified that error appears in the printed specification of the above numbered patent requiring correction and that the said Letters Patent should read as corrected below.

Column 4, line 32, for "halide" read —chloride—; line 62, for "chlorine," read —chlorine.—; column 7, line 35, for "(a)" read —(b)—; line 57, for "3, R'," read —3, R, R',—.

Signed and sealed this 26th day of May 1959.

[SEAL]

Attest:
KARL H. AXLINE,
*Attesting Officer.*

ROBERT C. WATSON,
*Commissioner of Patents.*